United States Patent [19]
Burd et al.

[11] Patent Number: 5,432,845
[45] Date of Patent: Jul. 11, 1995

[54] POST ANSWER TELEPHONE CALL REDIRECTION OR REROUTING

[75] Inventors: Margaret A. Burd, Thornton, Colo.; Rise J. Frankel, Somerset, N.J.; Steven T. Heinsius, Freehold, N.J.; Steven F. Knittel, West Allenhurst, N.J.; William G. Kuchenbecker, Naperville, Ill.; Arnold C. McQuaide, Jr., Eatontown, N.J.; Margaret H. Redberg, Red Bank, N.J.; Judith L. Sherman, Succasunna, N.J.; Michael M. Winseck, Jr., Boulder, Colo.

[73] Assignee: AT&T Corp., Murray Hill, N.J.

[21] Appl. No.: 993,754

[22] Filed: Dec. 21, 1992

[51] Int. Cl.⁶ .................................. H04M 3/42
[52] U.S. Cl. ................... 379/210; 379/207; 379/201; 379/112
[58] Field of Search ............ 379/201, 207, 210, 212, 379/211, 112, 115

[56] References Cited

U.S. PATENT DOCUMENTS

| | | | |
|---|---|---|---|
| 4,723,273 | 2/1988 | Diesel et al. | 379/211 |
| 4,757,267 | 7/1988 | Riskin | 379/201 |
| 4,878,240 | 10/1989 | Lin et al. | 379/67 |
| 4,893,335 | 1/1990 | Fuller | 379/200 |
| 4,908,850 | 3/1990 | Masson | 379/204 |
| 5,012,511 | 4/1991 | Hanle et al. | 379/211 |
| 5,036,535 | 7/1991 | Gechter | 379/201 |
| 5,153,907 | 10/1992 | Pugh | 379/114 |
| 5,168,515 | 12/1992 | Gechter | 379/201 |
| 5,210,789 | 5/1993 | Jeffus | 379/127 |
| 5,369,695 | 11/1994 | Chakravarti et al. | 379/207 |

OTHER PUBLICATIONS

P. Serratore, "Time to Step Up CO Services" *Telephone Engineer and Management*, Mar. 15, 1989, pp. 63–65.
G. Altehage, "Enhanced Features of the Deutsche Bundespost Telephone Network", International Switching Symposium, Session 24B, Paper No. 6, pp. 1–6.
H. Shimizu, et al. "Advanced Free Dial Service" *Japan Telecommunications Review*, Jul. 1987, pp. 15–18.
C. Miller, "Small Business can Expand with Remote Call Forwarding" *Marketing News*, Mar. 13, 1989 pp. 29–32.

Primary Examiner—James L. Dwyer
Assistant Examiner—Michael N. Lau
Attorney, Agent, or Firm—Barry H. Freedman

[57] ABSTRACT

Calls made to an 800 service subscriber are routed to the subscriber's primary location via a telephone network switch operating in conjunction with a specially configured adjunct processor. The adjunct processor is arranged to monitor the call even after it is answered by an attendant or other subscriber personnel at the primary location. If the call is to be redirected from the primary location to an alternate location, the adjunct is signaled, typically by a DTMF sequence. The adjunct responds by putting the calling party on hold and by initiating a call to the alternate location on an outgoing trunk of the network switch, in such a way that it emulates or imitates both the routing (call treatment) and billing the characteristics of a call made from the original customer location. Redirection can then be completed in one of three ways: blind transfer, consultation, or conference. Billing for the call is arranged so that the subscriber of the 800 number originally dialed by the calling party at the customer location pays only for the portion of the call in which the primary location is actively involved in communications with the calling party. The subscriber providing the 800 number for the alternate location pays for the portion of the call in which the alternate location is involved, as though the call originated from the customer's location and proceeded directly to the alternate location, without having been rerouted at the network switch. Thus, the subscriber is not charged for any period of time which is not "used" by that subscriber.

26 Claims, 7 Drawing Sheets

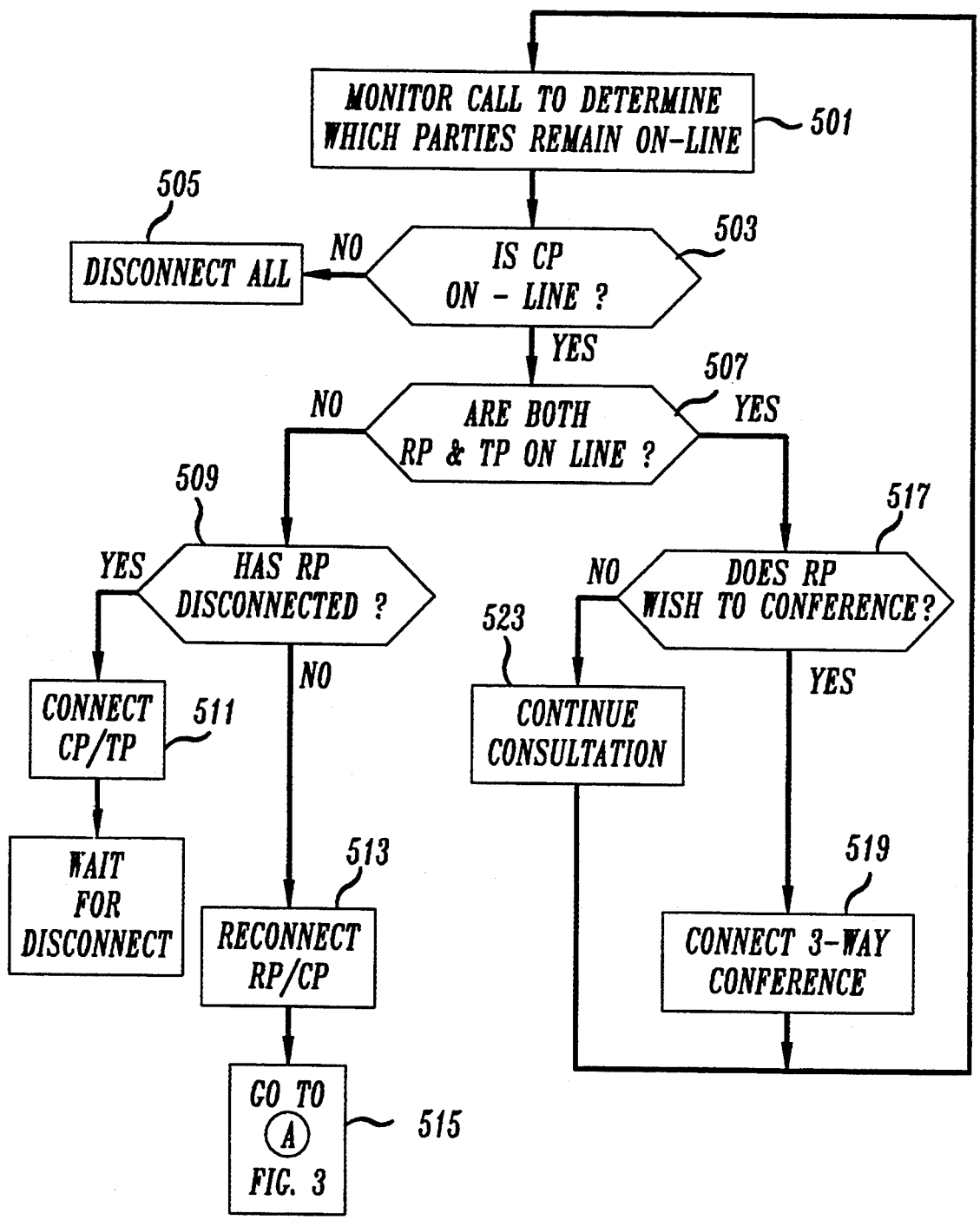

FIG. 8

| DIALED # | ARN SSS-TTT | ROUTING # FOR RP | FEATURE DESIGNATOR | ALTERNATE 800 # |
|---|---|---|---|---|
| (800) PAT-ENTS | 123-981<br>123-982<br>124-981 | 914 888<br>914 888<br>908 949 | PACR<br>–<br>RCP | <br><br>800-123-4567 |
| (800) LAW-YERS | 125-101<br>126-107 | 201 987<br>212 978 | –<br>AIF | <br>800-987-6543 |

801 802 803 804 805

POST ANSWER TELEPHONE CALL REDIRECTION OR REROUTING

FIELD OF THE INVENTION

This invention relates to processing of telephone calls, and, in particular, to redirecting or rerouting a call after the call has been answered in such a way that the redirected or rerouted call is completed as though it originated from the location at which the original call was placed.

BACKGROUND OF THE INVENTION

Many telephone subscribers, particularly large business entities, provide sophisticated and diverse services and information to their customers over the telephone. A particular calling party who is a customer of the subscriber may initially reach the subscriber by dialing a toll free or "800" type number provided by the subscriber. The calling party may then be connected to a "primary" subscriber location that is designated to answer calls placed to the subscriber from customers who originate calls from certain origination areas, e.g., originating area codes or telephone exchanges. It may then be determined that the attendant or other personnel at the primary subscriber location cannot fully service the customer. In that event, the attendant at the primary subscriber location may desire to reroute or redirect the call to an "alternate" location that is better equipped to handle or complete the call. This alternate location may be reached by dialing another 800 number, which may be provided by the same subscriber or by another 800 subscriber.

If the primary subscriber location is served by a private branch exchange (PBX), the transfer of an incoming call arriving via a first trunk, to an alternate subscriber location not served by the PBX, is presently accommodated by placing a second call to the alternate location using another, outgoing, trunk, and then bridging the incoming and outgoing calls. This type of call transfer arrangement incurs additional billed cost for the subscriber, since the subscriber continues to be billed for the call because the call continues to be routed through the PBX at the primary subscriber location. This charge may not benefit the subscriber, because the attendant at the primary location may no longer be "on the call" or talking. Also, the communications service provided to the calling party while the call continues to be routed through the PBX at the primary subscriber location can be sub-optimum, due to the "hair-pinning" of two subscriber grade trunks through the PBX to complete the transfer, effectively reducing the capacity of the PBX to handle other calls. In addition, the second call is treated as though it originated from the primary subscriber location, creating certain other routing problems described below.

If the call is placed through a network based adjunct processor, such as the Modular Services Node (MSN) described in U.S. Pat. No. 4,878,240 issued to S. M. Lin et al. on Oct. 31, 1989, the PBX hair-pinning problem can be avoided, since the MSN is located in the telephone network. However, in the Lin arrangement, the transferred call is not treated as originating from the calling party at the customer location. This is particularly troublesome in the case of "intelligent" call processing, in which the specific call treatment (routing) given to an 800 type call depends, among other factors, on where the call originated. Specifically, since the transferred call resembles a new call made in the adjunct, as opposed to originating at the customer location, the call may be routed to an alternate location that is different from the location to which the subscriber of the 800 number would wish to route calls from customers at that location. Intelligent call processing is normally associated with toll-free (800 number) calling, but will, in the future, also be available with respect to other telephone services.

Call redirection or rerouting also raises issues with respect to call billing. In particular, at the present time, when a call from a customer location to a primary location is subsequently redirected or rerouted to an alternate location, the party paying for the original call (the subscriber in the case of 800 type calls) will be charged for the cost of the entire time period of both the original and redirected calls, even though the attendant or personnel at the primary subscriber location may not participate in the call after redirection or rerouting to the alternate location. If the same subscriber provided the 800 number for the alternate location, which is typical, the same subscriber will also pay the cost of the redirected call for the time period of the redirected call. This subscriber may then, is essence, be charged twice for a portion of the time period of the redirected call, leading to subscriber dissatisfaction.

In the realm of 800 and other intelligent call processing services, one can easily see that a call redirection feature is needed that allows a call made to a primary location that is answered and determined to be better served by personnel at another location, to be rerouted to an alternate location, and yet to retain the original caller's identity, so that the appropriate routing or feature logic is invoked. This rerouting should be accomplished without utilizing superfluous network and PBX resources, without adding unnecessary subscriber loops to the talk path, and without charging the 800 subscriber for any portion of the redirected call which the subscriber is not actually "using".

SUMMARY OF THE INVENTION

The foregoing need is met and a technical advance is achieved in accordance with the invention by routing calls made by callers that are customers of a subscriber (typically an 800 or other intelligent network service subscriber) to a primary location via a telephone network switch operating in conjunction with a specially configured adjunct processor. The adjunct processor, which provides a feature referred to below as "post answer call redirection (PACR)", is arranged to monitor the call even after it is answered by an attendant or other subscriber personnel at the primary location. If the call is to be redirected from the primary location to an alternate location, the adjunct is signaled typically by inband signaling, for example, a dual tone multi-frequency (DTMF) sequence, or out of band signaling. The adjunct responds by putting the calling party on hold and by initiating a call to the alternate location on an outgoing trunk of the network switch. The second call is initiated in such a way that it emulates or imitates both the routing (call treatment) and billing characteristics of a call made from the original customer location. Redirection can then be completed in one of three ways: blind transfer, consultation, or conference. With blind transfer, the primary location disconnects before or while the second call is being established, and when the second call has been established, the second call is interconnected to or bridged with the original call, thereby completing a path from the customer location to the alternate location which bypasses the primary location. With consultation, a voice path is established between the primary location and the alternate location, while the calling party remains on hold. The attendant at the primary location can then disconnect, at which time the calling party is removed from hold and enabled to converse with the personnel at the alternate location, or the personnel at the alternate location can disconnect, enabling the primary location to initiate another call redirection. (If the calling party disconnects the entire call is terminated). If a conference is desired, the primary location can request interconnection or bridging of the calling party with the primary and alternate locations.

Advantageously, in accordance with an aspect of the invention, billing for the call is arranged so that the subscriber of the 800 number originally dialed by the calling party at the customer location pays only for the portion of the call in which the primary location is active. The subscriber providing the 800 number for the alternate location pays for the portion of the call in which the alternate location is involved, as though the call originated from the customer's location and proceeded directly to the alternate location, without having been rerouted at the network switch. Thus, the subscriber is not charged for any period of time which is not "used" by that subscriber.

In accordance with another aspect of the invention, the system keeps track of the number of times a particular call is redirected, and/or the number of times consultation is requested with respect to a particular call, so as to avoid the possibility that network capacity will be improperly allocated or the system will become subject to fraud or abuse. This can also be useful for the purpose of billing the redirecting party for using the redirection feature.

BRIEF DESCRIPTION OF THE DRAWING

The present invention will be more fully appreciated by consideration of the following detailed description, which should be read in light of the accompanying drawing in which:

FIG. 4 illustrates the manner in which FIGS. 2 and 3 are combined;

FIG. 5 contains a flow diagram illustrating the process by which a redirected call is completed;

FIG. 8 illustrates the format of records stored in database 162.

DETAILED DESCRIPTION

Figure 1:
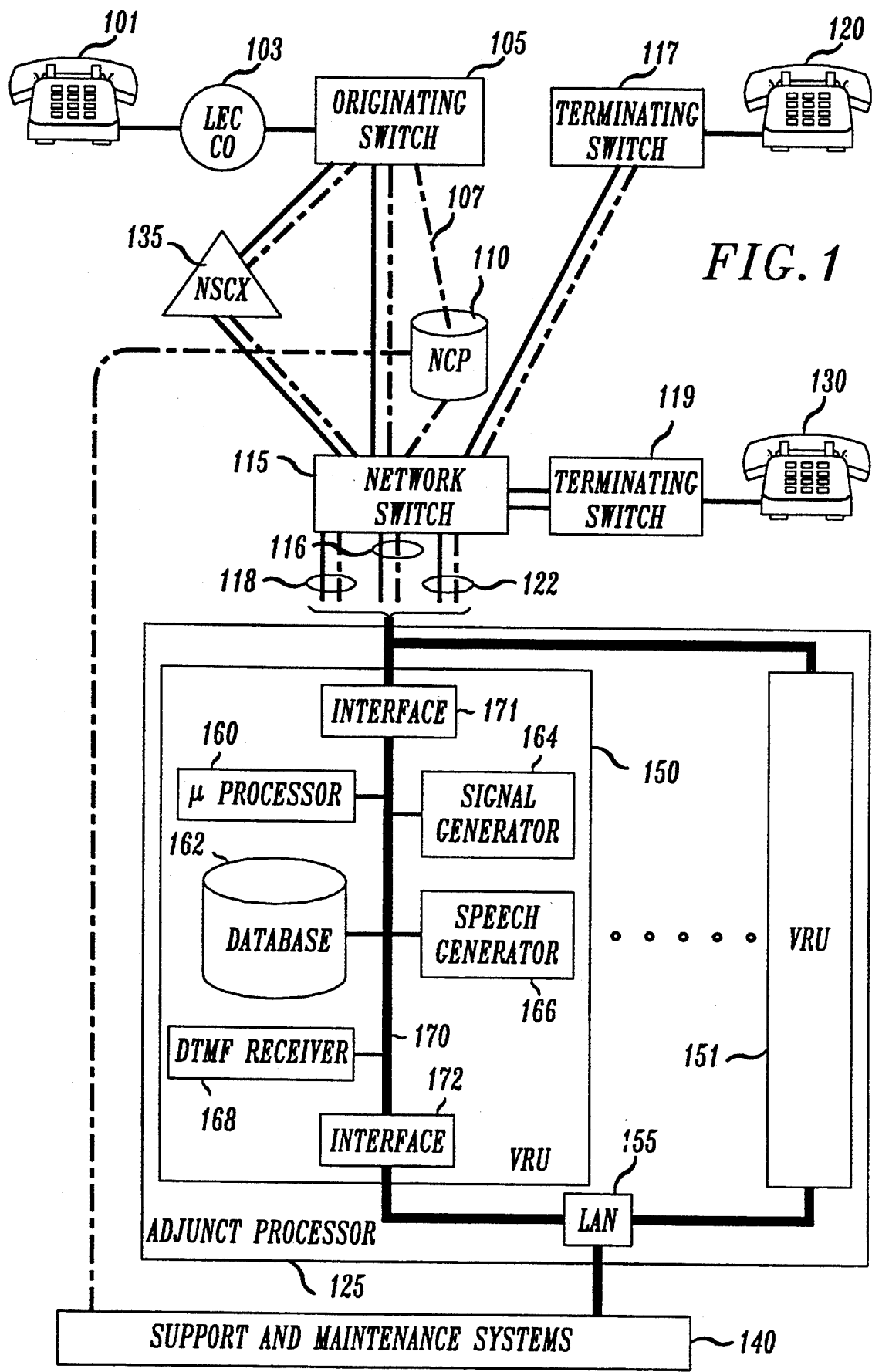
FIG. 1 is a block diagram of a system arranged to route telephone calls originated by a calling party at a customer location to a primary location and for monitoring the calls for a signal indicative of a desire to forward the call to an alternate location.

Referring first to FIG. 1, there is shown a block diagram of a system arranged in accordance with the present invention to route a telephone call originated by a calling party at a customer location 101 to a primary location 120 and for monitoring the call for a signal indicative of a desire to redirect the call to an alternate location 130. In the following description relating to FIG. 1, the attendant or other subscriber personnel at primary location 120 is referred to as the "redirecting party", and the attendant or other personnel at alternate location 130 is referred to as the "target party". The organization, arrangement and functionality of the different components of the system will be better appreciated by reading the following description of FIG. 1 in conjunction with FIGS. 2 and 3, which together contain a flow diagram illustrating the steps performed in the processing of a toll-free or 800 type call originated from customer location 101. However, it is to be understood that the invention may also be used in the context of other types of calls. It should also be recognized that designations of "customer" and "attendant" that are used are descriptive only, and that there is no requirement that the person placing the call from location 101 actually purchase any goods or services from the person receiving the call, nor is there any requirement the call received at locations 120 or 130 be handled by a live attendant as opposed to an interactive voice response unit or other automated device.

When an 800 call is originated (step 201) by the calling party at customer location 101 to a subscriber using the present invention, by dialing that subscriber's 800 number, the call is routed conventionally via a local exchange switch 103 (which may be a 5ESS® electronic switching system available from AT&T) to an "originating" switch 105 (which may be a 4ESS ™ electronic switching system available from AT&T) that services calls to that 800 number. Switch 105 launches a query in step 203 to a network control point (NCP) 110, which, as those skilled in the art are aware, is a centralized data base that is part of the SS7 signaling system. The query includes the dialed number and information identifying customer location 101, such as the automatic number identification (ANI) for the line serving that location. The query is made in the form of a data message transmitted to NCP 110 via a signaling link 107 (shown dotted for differentiation).

NCP 110 retrieves or "executes" the subscriber record associated with the received dialed number, in order to obtain a routing number used to direct originating switch 105 as to where to route the call. As described below, the records for subscribers who desire to obtain the post answer call redirection feature in accordance with the present invention, or related features, described in more detail below, are marked to indicate that calls should be forwarded to certain network switches, such as network switch 115, having an adjunct processor 125 that is arranged in accordance with the present invention. Thus, the routing number provided to switch 105 in step 205 is a special routing number that is designated hereinafter as an "adjunct routing number" or ARN. As will be understood by those skilled in the art, the routing number obtained from NCP 110 (sometimes referred to as "call treatment") can be made to be sensitive to the call origination location. This allows a subscriber to formulate a routing plan whereby, for example, calls from customers in the western region that are placed to the subscriber's 800 number are routed to a first service center in California, while calls from customers in the eastern region that are placed to the same 800 number are routed to a second service center in New Jersey.

As an example, calls to a particular 800 number may generate an adjunct routing number in the format SSS- TYT-XXXX, where SSS is an identifier associated with the particular network switch 115 connected to adjunct processor 125, TTT is an identifier associated with the record of the redirecting party at primary location 120, and XXXX represents information about customer location 101, such as originating Numbering Plan Area (NPA) information and other information entered by the calling party at customer location 101 (such as dialed number or responses to prompts) that may be useful to the subscriber.

It is to be noted here that NCP may provide other available features when it is queried in step 205. These features include, for example, call treatment that is sensitive not only to the location of the calling party, as described above, but also to the time of day and/or day of week that the call is made. Also, a "call prompter" service may be provided, whereby a calling party is connected to a network services complex 135 in FIG. 1, which is arranged to interact with the calling party using stored voice scripts, so as to play announcements to the calling party and/or collect information from the calling party. The collected information can then be used in further processing of the call.

Another aspect of the invention is that the routing number provided to the switch generating the query, in this case originating switch 105, contains a code that can be interpreted by the switch as providing multiple, sequential routing choices. Thus, when the switch receives the code, it can retrieve a table containing information defining the first choice routing, which is used, if available. The table also contains information defining a second choice routing, which is used, however, in the event that the first choice is busy, out of service, or otherwise unavailable. The table may include information defining additional routing choices. This arrangement is particularly useful in order to provide backup capability in the event that a particular network element, such as adjunct processor 125, may be temporarily inoperative.

When originating switch 105 receives the ARN from NCP 110, it generates a call setup message for the appropriate destination, in this case, network switch 115. The setup message typically includes the ARN as well as information identifying the calling party and the dialed number. As described in more detail below in conjunction with FIG. 6, an Automatic Message Accounting (AMA) billing record is opened in originating switch 105 at this time for the purpose of billing the subscriber for the call.

When network switch 115 receives the call setup message from originating switch 105, it in turn formulates a setup message destined for adjunct processor 125. This setup message, which may be formulated in Q.931 format in accordance with ISDN standards, also includes the ARN and information identifying customer location 101 and the dialed number. This message is supplied, in step 207, to adjunct processor 125 on an available ISDN trunk, designated as trunk 116 in FIG. 1.

Adjunct processor 125, which is described in more detail below, may be based upon and include several automatic voice response units (VRU's) that are each capable of performing numerous call processing and logical functions, such as detecting and validating redirection requests, initiating outgoing calls, originating out of band signaling messages such as those required for network billing purposes, bridging calls, creating three way conferences, maintaining counters, and playing generic voice announcements. The steps performed by adjunct processor 125 are differentiated in FIGS. 2 and 3 by being included within a dotted rectangle labeled 275.

As shown in FIG. 1, adjunct processor 125 may include several VRU's 150, 151 interconnected by a local area network 155. Each VRU, includes a microprocessor 160 that operates under the control of programs which could be stored in a database 162. Database 162 is also arranged, in accordance with the invention, to store records that contain information describing the redirection features to are to be provided to each subscriber. The VRU also includes signal and speech generators 164 and 166, respectively, and a DTMF receiver 168 arranged to detect various touch tone sequences that signal a desire to invoke features provided by adjunct processor 125. The individual elements in VRU 150 are interconnected by a common bus 170. Switch and LAN interfaces 171 and 172, respectively, are provided to interface the VRU with the network switch to which it is interconnected, and to the local area network or other network from which data, maintenance and/or program updates may be received from an external support and maintenance system 140. Note that support and maintenance system 140 may be connected to NCP 110, so that information contained therein can be appropriately updated.

In step 209, adjunct processor 125 receives the setup message and uses the information contained therein, in step 211, to retrieve stored information from database 162, indicative of the features to be provided to the subscriber whose 800 number was dialed. If it is determined, in step 212, that a subscriber record exists in database 162, the process continues with step 213. If no subscriber record can be found, an announcement is played by adjunct processor 125 to the calling party, and the process is terminated in step 214. In lieu of an announcement, the calling party may receive a "reorder" tone or fast busy signal.

Once a subscriber record has been retrieved, a determination is made in step 213 as to whether the call redirection feature of the present invention is to be provided with respect to this call, as opposed to another feature. If a positive result is obtained in step 213, the process continues with step 217. If it is determined in step 213 that the subscriber is to be provided with other features known as recurrent call prompter (RCP) or advanced information service, which features can also be provided by the arrangement shown in FIG. 1, then certain modifications of the process of FIGS. 2 and 3 will occur in step 215. These modifications are described in more detail below.

In step 217, adjunct processor 125 performs a routing translation by which the information received from network switch 115 and the information retrieved from database 162 is combined to formulate a call setup message (identifying customer location 101, the dialed number, and the other information received from network switch 115) that can be interpreted by network switch as a request to initiate a call to to the redirecting party at primary location 120. Adjunct processor 125 determines if an outgoing trunk, such as trunk 118, is available, and if so, reserves it. The call setup message is then passed back to network switch 115 in step 219, causing that switch to set up a call to primary location 120 via terminating switch 117, which serves that location. In response to receipt of the setup message, terminating switch 117 attempts to complete the call to primary location 120.

Once the call setup message is sent from adjunct processor 125 to terminating switch 117, adjunct processor 125, in step 219, connects (bridges) the incoming call from customer location 101 to the reserved outgoing trunk 118. At the same time, in step 221, adjunct processor 125 sends billing information to originating switch 105, as described more fully below. Also at this time, in step 223, adjunct processor 125 connects DTMF receiver 168 to the outgoing trunk 118 directed to primary location 120, in order to monitor the call for an indication from the redirecting party that the call is to be redirected. This indication, as stated previously, is typically signaled through application by redirecting party of one or more touch-tone sequences, illustratively the sequence "*T".

When redirecting party at primary location 120 answers the call, answer supervision is propagated back through the network to adjunct processor 125, which detects the answer in step 224 and in turn forwards an answer message back toward originating switch 105 and the LEC central office in which switch 103 is located. For billing purposes, originating switch 105 begins elapsed time recording for the call from the calling party to the redirecting party in response to receipt of answer supervision.

Before describing the initiation of redirection, it is instructive to note that a "conventional" 800 call from customer location 101 to primary location 120 would typically not take the path just described. Rather, NCP 110, when queried, would instead route the call from originating switch 105 directly to terminating switch 117 serving primary location 120, via call path which is not shown in FIG. 1. Thus, it is to be observed that when the redirection feature of the present invention is invoked, the call path may be extended to include an additional switch, in this case, network switch 115. The possibility of extending a call through an additional network switch can be avoided by associating an adjunct processor with each network switch, or reduced by associating separate adjunct processors with several network switches. In the example illustrated in FIG. 1, since switch 117 does not have an associated adjunct processor, routing through an additional switch, in this case, network switch 115, is required. However, the advantages of this arrangement to subscribers will outweigh the disadvantage of additional routing.

It is also beneficial to summarize the call routing at this point in the processing of a call. The calling party has been connected to a redirecting party via a path that originates in customer location 101 and includes originating switch 105, network switch 115, adjunct processor 125 and terminating switch 117. Routing through adjunct processor 125 occurred because the subscriber was identified as having the redirection feature by the dialed number, when NCP 110 was queried. The routing of the call to network switch 115, and its associated adjunct processor 125, as opposed to another switch and its associated adjunct processor (not shown in FIG. 1) occurred as a function of the dialed number for the subscriber, the customer location 101, and the routing logic contained in NCP 110 that may have been specified by the subscriber. In implementations in which multiple adjunct processors are available in the network, routing to a particular network switch/adjunct processor combination will be determined as a function of the location of the calling party.

Figure 3:
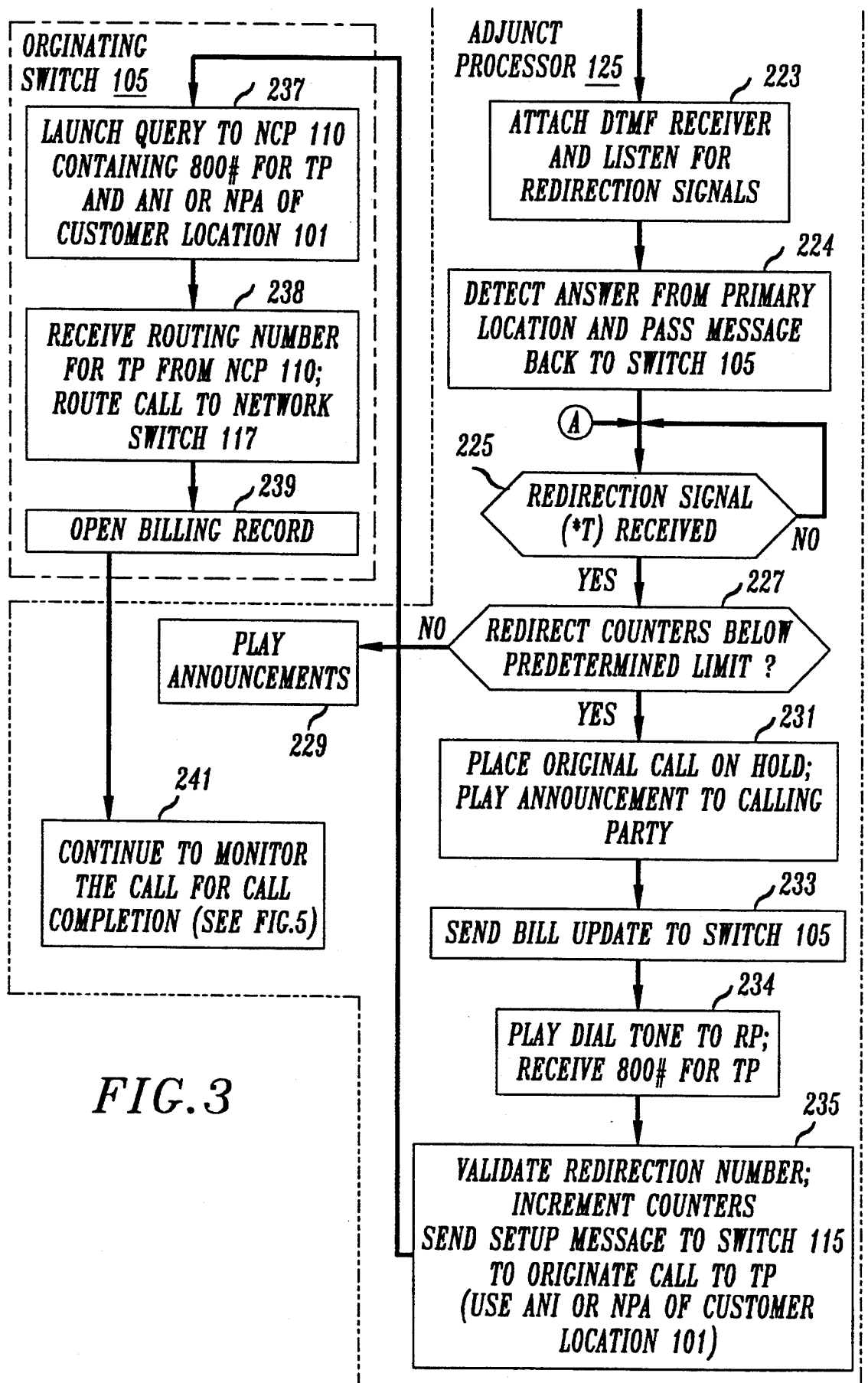

Returning to a description of the process illustrated in FIG. 3, when a redirecting party at primary location 120 identifies a need to either transfer, consult or setup a three way conference, a touch-tone sequence "*T" is generated by the redirecting party and detected by DTMF receiver 168 within adjunct processor 125, in step 225. Adjunct processor 125, in step 227, checks several counters for permission to proceed, as more fully described below, to assure that a predetermined limit has not been exceeded and that call redirection is therefore permissible at this time. If the limit has been exceeded, a negative permission result is obtained, an announcement may be played to the terminating party in step 229, indicating that redirection is not permitted.

If a positive result is obtained in step 227, indicating that redirection is permitted, adjunct processor 125 places the incoming call from customer location 101 on hold in step 231, and plays an announcement to the calling party, advising that party that they have been placed on hold. In step 233, adjunct processor 125 sends an update bill message to originating switch 105, in order to update the billing record to include the cost of the redirection, if a cost is indeed imposed on the redirecting party. Adjunct processor 125, in step 234, then plays a dial tone to the redirecting party and the redirecting party enters a redirection number for the target party at alternate location 130, via touch tone signals. In response, adjunct processor 125 validates the redirection number format, increments its counters, and generates a setup message in step 235 to initiate a second call, via trunk 122, to alternate location 130. This call setup message, which is transmitted to network switch 115, is arranged, in accordance with the present invention, to identify the call with the telephone number of customer location 101, rather than the number of primary location 120. As a result, in step 237, network switch 115 formulates and transmits a query to NCP 110 that includes the telephone number of customer location 101, rather than the number of primary location 120. This query also includes the redirection number (the number of the target party at alternate location 130) supplied by the redirecting party in step 234.

Note here again, that when NCP 110 responds to the query originated from network switch 115, it may do so using all of its otherwise available features. This includes call treatment that may be determined as a function of the ANI or NPA of the location in which the call originated, in this case specified as customer location 101, as well as the "call prompter", "courtesy response" and "alternate termination sequence" features.

By providing network switch 115 with the origination information pertaining to customer location 101 rather than primary location 120, the redirected call is routed to the appropriate target party that would have received the call had the call to the same number been actually originated from customer location 101. In step 238, NCP 110 provides, and network switch 115 receives, a routing number to the target party at alternate location 130 in response to the query launched by switch 115 in step 237. This routing number is used by network switch 115 to complete the redirected call, which as shown in FIG. 1 is routed via another terminating switch 119. When network switch 115 receives the routing number for the target party, it opens a billing record for the redirected call in step 239, using the information received from NCP 110. That information includes the telephone number of customer location 101 rather than the telephone number of redirecting party at primary location 120, and the redirection number. (Note that, for informational purposes, the number of the redirecting party may be provided on the billing record.) At this point, as shown in FIG. 3, adjunct processor continues to monitor the call, in step 241, to determine how to "complete" the redirection process.

The call completion process, which is illustrated in FIG. 5, can result in three "outcomes", depending upon the actions of the redirection party, the calling party and the target party. First, and most typically, a "blind transfer" can occur, wherein the calling party, already on hold, is connected to the new target party when that party answers, and wherein the redirecting party drops the call once the 800 number for the target party has been dialed. When this outcome occurs, the billing record opened by originating switch 105 in step 203 is now closed, so that the redirecting party is no longer billed for the redirected call. A billing record for the redirected call is, however, opened for this portion of the call. This is discussed more fully below.

Second, one or more "consultations" can occur, wherein the called party remains on hold while the redirecting party communicates with one or more target parties. Consultation can be followed by blind transfer when the appropriate target party has been identified.

Third, a conference between all three parties may be desired. If a conference is arranged by the redirecting party, it may be followed by disconnection of the redirecting party, thereby effecting a more conventional call transfer.

The call completion process can also be terminated if the calling party disconnects. If this happens, any other party on the call is also disconnected, and any billing records previously opened are closed.

Referring now to FIG. 5, for the purpose of completing a redirected call and determining which of the outcomes described above is to be provided, adjunct processor 125 monitors the status of trunks 116, 118 and 122 in step 501, to determine which parties remain on the line. If it is determined in step 503 that the calling party has not remained on the line, all of the parties are disconnected in step 505, and the call is terminated. As long as a positive result is obtained in step 503, a determination is made in step 507 as to whether both the redirecting party and the target party are on-line. If a negative result is obtained, a determination is made in step 509 as to whether the redirecting party has disconnected. If so, a blind transfer is desired, and the calling party is connected to the target party in step 511. On the other hand, if the redirecting party has not disconnected, but the target party is not on-line, it is presumed that the redirected call to the target party could not be completed or continued. In this event, the redirecting party is reconnected to the calling party in step 513, and step 515 results in a resumption of the process in adjunct processor 125 at step 223 of FIG. 3.

If a positive result is obtained in step 507, indicating that both the redirecting party and the target party remain on-line, a determination is next made in step 517 as to whether the redirecting party, who has control of the call outcome, has entered a DTMF tone sequence, illustratively "*R", which signals a desire to establish a three-way conference. If this sequence is detected in step 517, the conference is established in adjunct processor 125 in step 519, using the conferencing capability of VRU 150, 151. If the "*R" sequence requesting a conference has not been detected in step 517, consultation between the redirecting party and the target party is continued in step 523. Following the outcomes in steps 511, 523 and 5 19, the redirection completion process of FIG. 5 is repeated by returning to step 501.

Figure 6:
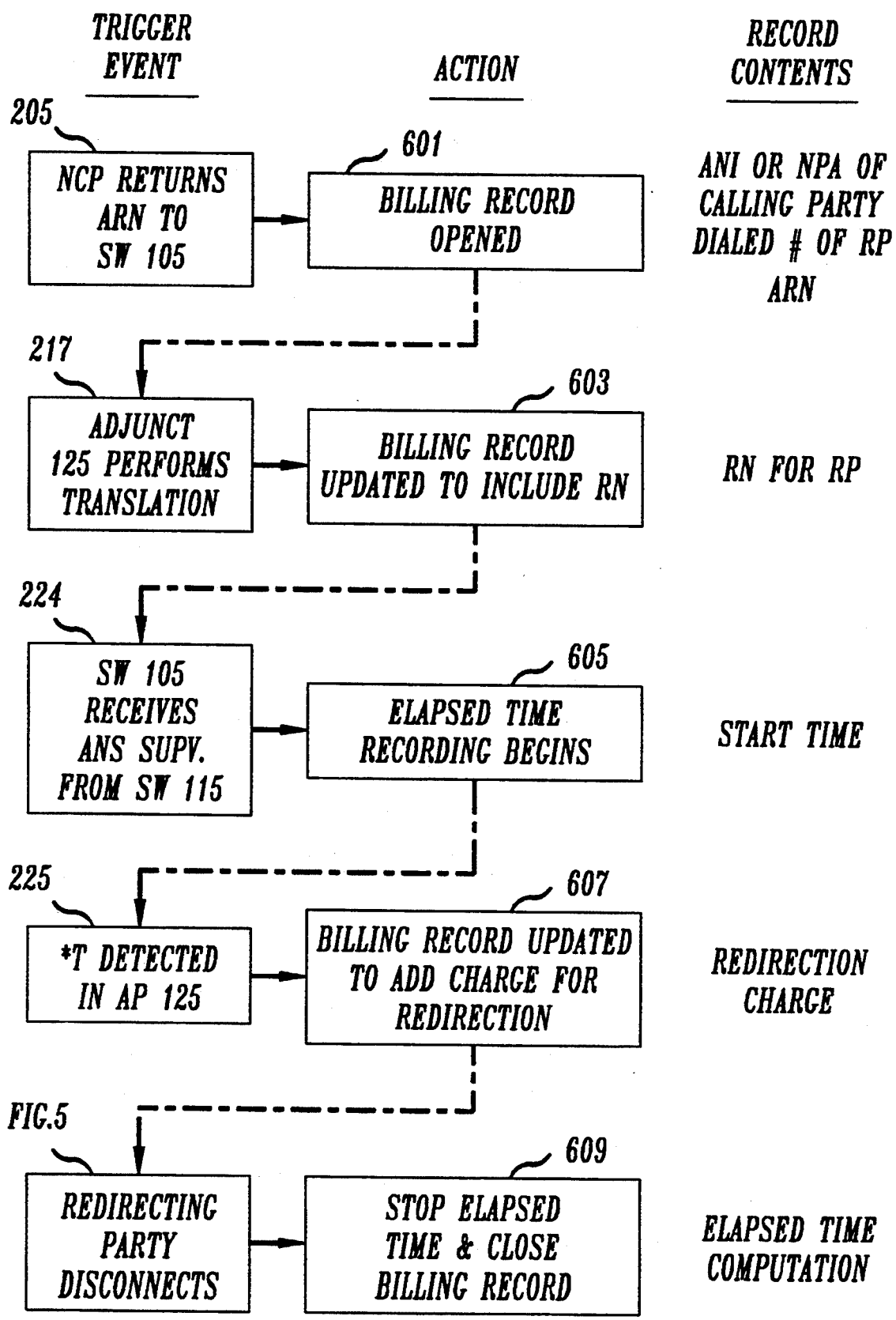
FIGS. 6 and 7 are flow diagrams illustrating the steps followed in originating switch 105 and in network switch 115, respectively, for the purpose of billing for calls made using the system of FIG. 1.
Figure 7:
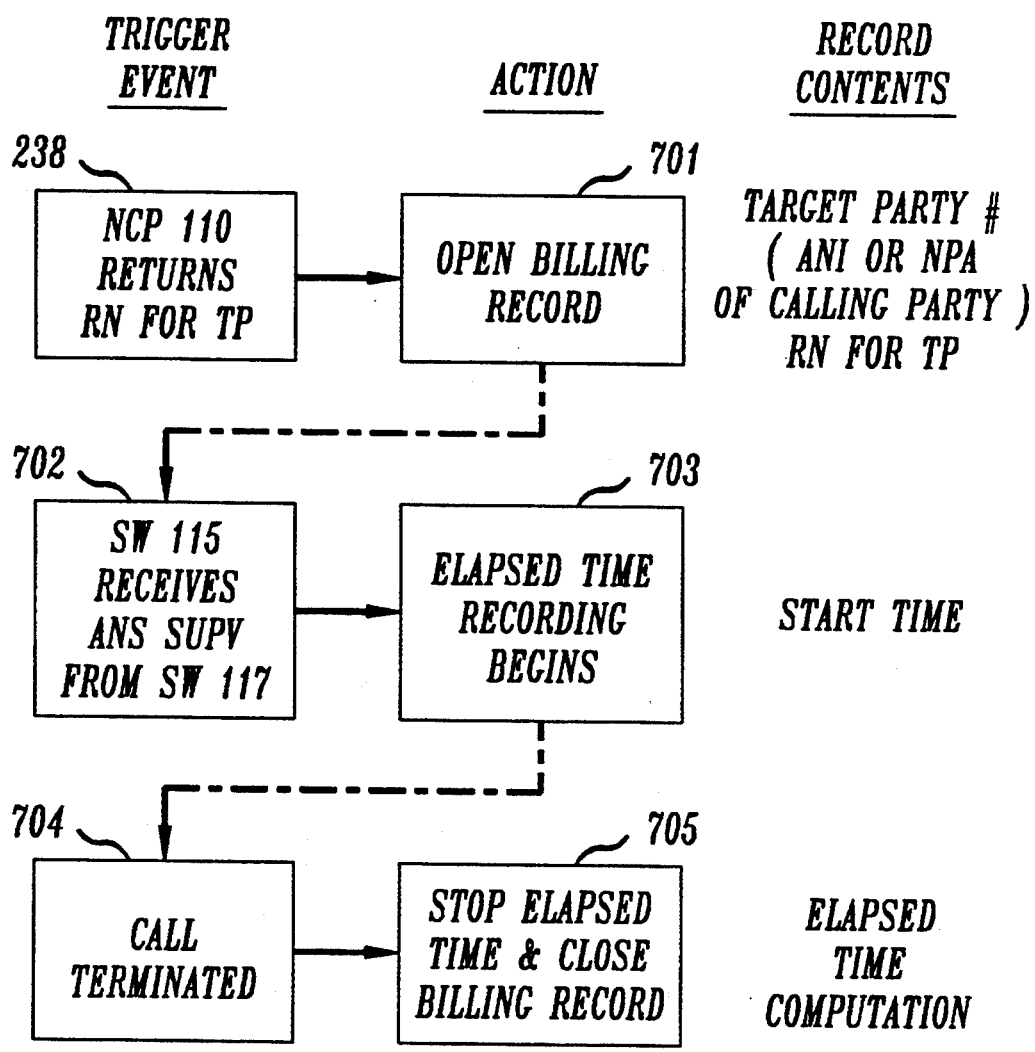

FIGS. 6 and 7 are flow diagrams illustrating the steps followed in originating switch 105 and in network switch 115, respectively, for the purpose of billing for calls made using the system of FIG. 1. Steps 601–609 and 701–705 illustrated in these figures are triggered by certain steps performed in the process of FIGS. 2 and 3, and the triggering interrelationship is denoted by dotted lines in FIGS. 6 and 7. As indicated previously, the billing record prepared in originating switch 105 represents the charges for the call placed by the calling party to the redirecting party. Since this call is typically an 800 call for which the redirecting party is the subscriber, this bill is considered the redirecting party bill. On the other hand, the billing record prepared in network switch 115 represents the charges for the call received by the redirecting party and redirected to the target party. Since this call is also an 800 call for which the target party is the subscriber, this bill is considered the target party bill. However, the same entity often is the subscriber for both 800 numbers.

Figure 2:
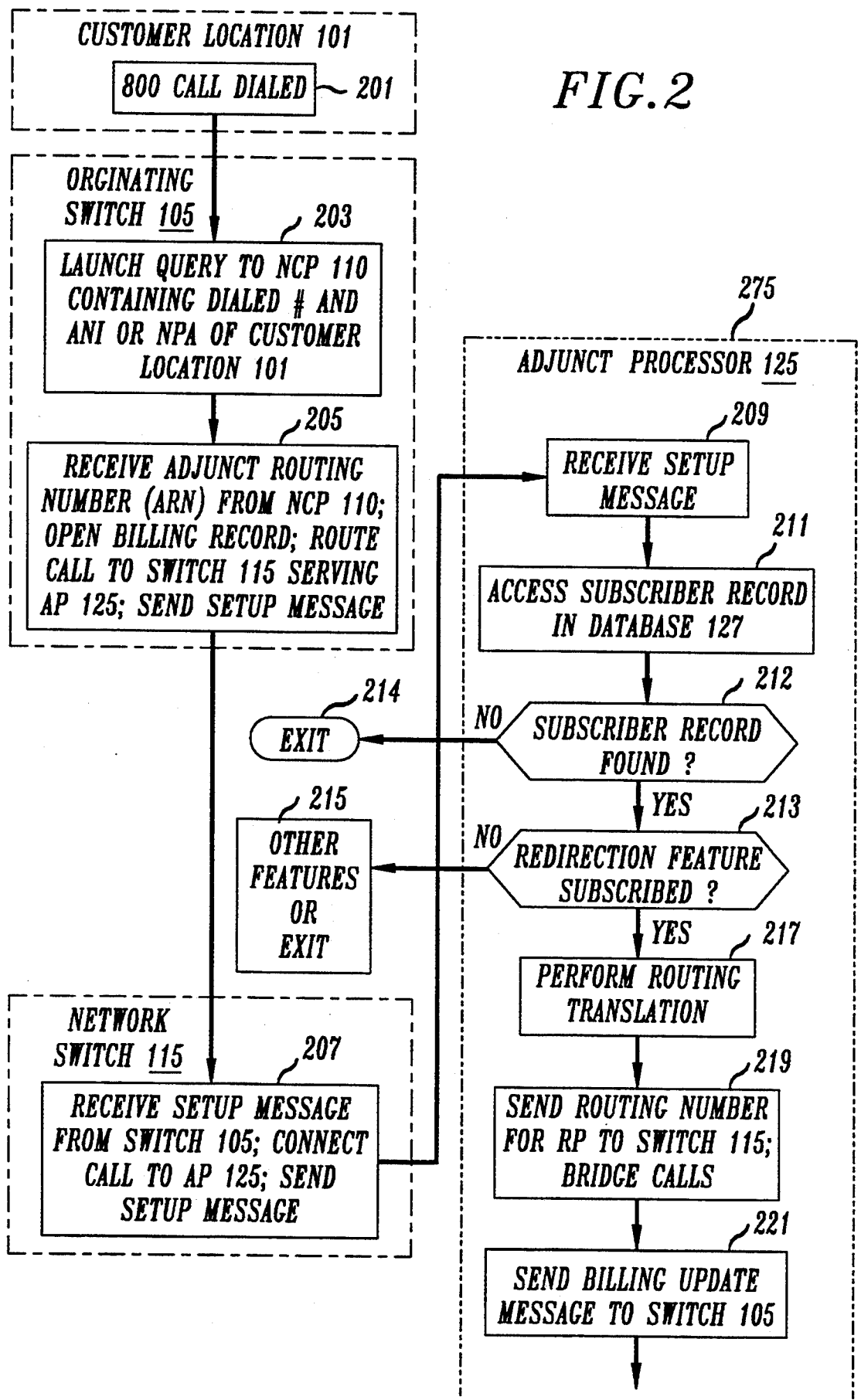
FIGS. 2 and 3 contain a flow diagram describing the process performed when using the system of FIG. 1.

Referring first to FIG. 6, the billing process performed in originating switch 105, by which a bill is prepared for the redirecting party, i.e., the subscriber of the 800 number dialed by the calling party, is initiated by opening a billing record in step 601 which is triggered when NCP 110 returns the adjunct routing number in step 205 of FIG. 2. This billing record includes the dialed number, information identifying the caller, typically ANI, or if not available, at least the area code (numbering plan area or NPA) of customer location 101 and the routing number returned to switch 105 from NCP 110.

When adjunct processor 125 performs a routing translation in step 217 of FIG. 2, this triggers originating switch 105 to perform a billing record update in step 603. In this step, the ARN is interchanged with or replaced by the routing number of the redirecting party at primary location 120. This is done so that the bill, when rendered to the subscriber, will contain meaningful information about the call. Next, when originating switch 105 receives answer supervision from network switch 115 in step 224, of FIG. 2, this triggers originating switch 105 to respond, in step 605, by entering a start time in the billing record and by recording elapsed time for the call. This status continues until a signal indicative of redirection is received in adjunct processor 125 in step 225 of FIG. 2. In response to this trigger, the billing record is updated in step 607, so that a charge for use of the redirection feature may be added to the bill, if such a charge is imposed on the redirecting party by the service provider. If desired, the telephone number of the target party can be recorded and entered on the bill, thereby making the bill more meaningful to subscriber of the post answer call redirection feature.

When the redirecting party disconnects, the disconnection is detected by adjunct processor 125, which formulates a message and transmits it to originating switch 105. Note that this message is formulated even though the calling party may continue to communicate with the target party via a communication path that includes switches 105, 115 and 119 and adjunct processor 125. In response to this message, the recording of elapsed time is stopped in step 609, and the billing record is closed. Alternatively, if the call is terminated because the calling party hangs up, the billing record in switch 105 is also closed. However, in this circumstance, the record is closed conventionally, in response to the discontinuance of the call, and does not result from a message generated in adjunct processor 125. In either event, the billing record, which contains information identifying the calling party, the dialed number, the elapsed time and an indication of use the redirection feature, may then be forwarded, in a conventional manner, to a bill preparation processor which combines the records for all calls chargeable to a subscriber.

Referring now to FIG. 7, the billing process performed in network switch 115 by which a bill is prepared for the target party, i.e., the subscriber of the 800 number dialed by the redirecting party, is initiated by opening a billing record in step 701 which is triggered when NCP 110 returns the routing number for terminating switch 119 serving alternate location 130 in step 239 of FIG. 3. This billing record includes the number of the target party provided by the redirecting party and information provided by adjunct processor 125 identifying the originator of the call as the calling party, rather than the redirecting party. This information is typically ANI, or if not available, at least the area code (numbering plan area or NPA) of customer location 101. This billing record is processed in network switch 115 in the normal manner. Briefly, when the call is answered by the target party, network switch 115 receives answer supervision from terminating switch 119 in step 702, triggering elapsed time recording which begins in step 703. When the call is later terminated in step 704, this triggers elapsed time recording to be stopped, and the billing record is closed in step 705. The record can the be forwarded conventionally for further bill preparation and processing.

When one or more consultations occur between the redirecting party and one or more target parties, the calling party remains on hold. In such instances, the billing record for the redirecting party remains open, until the calling party or the redirecting party disconnect. Individual records are generated for the target parties, if more than one consultation is performed.

It is to be noted here that when the redirecting party provides a telephone number for the target party in step 235, adjunct processor 125 is usually arranged so that only a toll free or 800 type number is accepted. This is because the redirected portion of the call is treated as though it originated from the calling party, not the redirecting party. Thus, if this restriction were not imposed, the redirecting party could redirect a call to a conventional number in which the calling party is billed, and thereby impose charges on the calling party that are unexpected. If a toll free number is not provided by the redirecting party in step 235, adjunct processor 125 may be arranged to play an appropriate message.

It is also to be noted that the 800 number for the target party, may, and in many cases, will be, the number of the same subscriber to whom the original call to primary location 120 was directed. Indeed, the subscriber may also subscribe to the redirection feature for the alternate location as well. In such event, the call originated from adjunct processor 125 and routed through network switch 115 in accordance with a query response received from NCP 110 in step 241 may be returned again to adjunct processor 125, or to another adjunct processor in the telephone network. In order to avoid the possibility of excessive use of the resources in adjunct processor 125, and the possibility of fraud, counters are provided in processor 125 to keep track of (a) the number of redirections (i.e., independent loops through processor 125 when successive 800 numbers are each subscribers to the redirection feature) attempted for any given call, and (b) the number times a particular call is extended to a different target party, even though the target party is not a subscriber of the redirection feature. If the count in any of the counters exceeds a predetermined limit, then further redirection or processing is blocked in step 229 of FIG. 3.

As stated above, other features, in addition to post answer call redirection, may be provided to a subscriber using the arrangement of the present invention shown in FIG. 1. These features, which are known as "recurrent call prompter (RCP)" and "advanced information forwarding (AIF)", are provided to a particular subscriber if that subscriber's record, stored in database 162, is appropriately marked. In that event, when step 213 is performed, the subscriber's feature will be identified.

If RCP is provided, then the process performed in adjunct processor 125, specifically steps 225 and 235, is modified. In step 225, a different touch-tone sequence, such as "*M", is selected to indicate a request from the redirecting party to return the calling party to an announcement facility, such as network services complex (NSCX) 135, rather than connecting the terminating party to a target party. Step 235 is modified to send the originally dialed 800 number, rather than a new 800 redirection number supplied by the redirecting party, to NSCX 135, so that the appropriate stored message can be played. NSCX 135 may be connected to both originating switch 105 as well as network switch 115, so that its announcement, digit collection and other capabilities are available both when the original call is initiated, and thereafter, when the call is redirected, or there may be a "service assist" to get access to the NSCX at another switch.

With respect to the AIF feature, steps 225 and 235 are also modified. In step 225, a disconnect signal or other out of band signaling received from the redirecting party produces a positive response in that step, as opposed to receipt of a particular touch-tone sequence. This disconnect signal is indicative not only of the fact that the redirecting party desires to terminate participation in this portion of the call, but also indicates that information obtained by redirecting party from calling party at customer location 101 should be used to continue the call. Indeed, in most situations in which this feature is involved, primary location 120 will be served by an automated attendant as opposed to a live operator provided by the subscriber, and primary location 120 and alternate location 130 will be directly connected to switches 117 and 119 by Integrated Services Digital Network (ISDN) trunks. The disconnect signal will be a digital message that includes data obtained from calling party at customer location 101. In step 235, the setup message transmitted to network switch 115 is specially modified to include the information received from redirecting party at primary location 120 which, as stated previously, includes information obtained from calling party 101. In addition, the 800 number provided to network switch 115 by adjunct processor 125 is not provided by redirecting party at primary location 120. Instead, it is a prestored 800 number provided by the subscriber, which will serve to route the call to a predetermined destination, such as the target party at alternate location 130. In lieu of a prestored 800 number, other special service (e.g., 900 or 700) numbers can be used, or the call can be directed to a POTS number.

Referring now to FIG. 8, there is shown a typical format for records stored in database 162. Field 801 includes the dialed number, typically an 800 number for a subscriber of the present invention. For each 800 number, several ARN's may exist in field 802. This is because the ARN returned by NCP 110 and received by originating switch 105 in step 205 of FIG. 2 can be one of many different routing numbers provided by the 800 subscriber, depending, for example, upon the location of the calling party, the time of day or day of the week in which the call was made, a percentage allocation desired by the subscriber, or inputs entered by the calling party in response to prompting generated by NSCX 135. The ARN included in field 802 can be six digits, the SSS and TTT digits described above, and exclude the XXXX information which is calling party specific, since the latter information can be simply buffered in adjunct processor 125 and returned to network switch 115 as part of the routing number for the redirecting party which is contained in field 803. Thus, field 803 contains, for each ARN, a six digit routing number (RN) for the redirecting party. When combined with the four digit XXXX information, this routing number can be thought of as a "dialable" number that corresponds to and specifies a particular primary location. It is in the nature of a so-called "POTS" number, rather than an 800 or other special services number, and it does not require translation in an NCP. The record includes, in field 804, a feature designator, that indicates whether the subscriber desires post answer redirection, recurrent call prompter, the advanced information service feature described above, or yet additional features. Field 805 contains an 800 number which is used when the subscriber desires the RCP and advanced information features. In these instances, the 800 number contained in this field is supplied to network switch 115; together with a numbering plan indicator, in order to signal network switch 115 to perform an NCP query and thereafter route the call in the manner expected for 800 calls.

In the foregoing description, reference has been made to "originating" "network" and "terminating" switches. Those skilled in the art will recognize that these designations relate to the functions performed by a given switch at a given time in the call routing and completion process, and are not intended to differentiate between hardware/software capabilities present in such switches. In the arrangement of FIG. 1, switches 105, 115, 117 and 119 may all be 4ESS switches available from AT&T.

Various modifications may be made to the present invention, as will be apparent to those skilled in the art. For example, while the rerouting of calls under the direction of customer "personnel" has been described, it is to be understood that some or all actions taken by persons may alternatively be taken by computer controlled processors or other mechanical devices, such as those which recognized and process speech patterns or out of band signaling and react in accordance with predefined logical routines. Also, while conferencing initiated by the redirecting party has been described as involving up to three parties, it is to be understood that adjunct processor 125 could be arranged to permit additional redirections to add even more parties.

We claim:

1. A system for completing telephone calls comprising means including a switch having a processor for routing a first call originated from a calling party at a customer location to a redirecting party at a primary location, said primary location being determined as a joint function of (a) the telephone number dialed by said calling party and (b) the telephone number of said customer location, means in said processor for monitoring said first call, after it has been completed to said primary location, for a redirection signal indicative of a desire to forward said first call to an alternate location, means in said processor responsive to said redirection signal for routing a second call initiated in said processor from said switch to said alternate location, said alternate location being determined at least in part as a function of said telephone number of said customer location, and means for completing a call path between said calling party and said alternate location which excludes said primary location, by interconnecting said first and second calls.

2. The invention defined in claim 1 wherein said first call is routed from said calling party to said primary location through said processor and said second call is routed from said primary location to said alternate location through said processor, and wherein said first and second calls are bridged by said processor.

3. The invention defined in claim 1 wherein said processor further includes means for billing said redirecting party for a forwarded call as though it originated from said customer location and proceeded directly to said alternate location, without having been routed to said primary location.

4. The invention defined in claim 1 wherein said redirection signal is a touch tone sequence generated in said primary location.

5. The invention defined in claim 1 where said processor further includes means for updating a bill record generated for said first call to indicate the redirection of said call to said alternate location.

6. The invention defined in claim 1 wherein said signal indicative of a desire to redirect said call to said alternate location is a dual tone multi frequency (DTMF) signal, and said system includes means for recognizing predefined sequences of DTMF signals.

7. The invention defined in claim 1 wherein said processor is arranged to continue to monitor said call after said call is redirected to said alternate location.

8. A system for completing telephone calls comprising means including a switch having a processor for routing a first call originated from a calling party to a redirecting party at a primary location, said primary location being determined as a joint function of (a) the telephone number dialed by said calling party and (b) the location of the telephone from which said calling party originated said first call, means in said processor for monitoring said first call, after it has been completed to said primary location, for a signal indicative of a desire to initiate at least one additional call from said processor to a target party at another location, means in said processor for signaling said switch to initiate said at least one additional call, wherein the routing of said at least one additional call is determined at least in part as a function of said location of said telephone from which said calling party originated said first call, and means for completing a call path between said calling party and said another location by bridging said first and said at least one additional calls in said processor.

9. The invention defined in claim 8 wherein said last mentioned means includes means for conferencing said calling party, said redirecting party and said target party.

10. The invention defined in claim 8 wherein said system is arranged to store an indication of the number of additional calls initiated from said switch, and to allow said additional calls only if said indication is below a threshold.

11. The invention defined in claim 8 wherein said last mentioned means is arranged to complete a sequence of calls to multiple locations.

12. A call processing and billing method comprising
connecting a call from a first station to a second station,
contemporaneously with said connecting, initiating a first billing record for said call, said first billing record including information indicative of the charge for a call made from said first station to said second station,
redirecting said call by connecting said first station to a third station,
contemporaneously with said connecting of said call to said third station, initiating a second billing record for said call, said second billing record including information indicative of the charge for a call made from said first station to said third station,
terminating said first billing record when said second station is disconnected from the redirected call, and
terminating said second billing record when (a) said redirected call is terminated or (b) said third station is disconnected from said call.

13. A method in accordance with claim 12 where said connecting a call step includes
establishing a call from said first station to an adjunct processor,
establishing a call from said adjunct processor to said second station, and
bridging said first and second calls.

14. A method in accordance with claim 12 wherein said call redirecting step includes
establishing a call from said adjunct processor to said third station, and
bridging said third station onto said call and dropping said second station from said call.

15. A method in accordance with claim 12 wherein said call redirecting step includes
establishing a call from said adjunct processor to said third station, and
adding said third station onto said call while maintaining said second station on said call, thereby conferencing said first, second and third stations.

16. A method in accordance with claim 12 further comprising
transmitting said first and second billing records to a billing center.

17. A call billing method comprising
initiating a first billing record for a call contemporaneously with a connection of said call from a first station to a second station,
initiating a second billing record for said call contemporaneously with a redirection of said call from said second station to a third station,
wherein said second billing record is generated as though said call redirected by said second station to said third station originated from said first station.

18. A method in accordance with claim 17 where said call from said first station to said second station is a toll free call billed to a subscriber providing said second station, and said call from said second station to said third station is a toll free call billed to a subscriber providing said third station.

19. A method in accordance with claim 17 further comprising
completing said first billing record at the time said first call is redirected from said second station to said third station.

20. A call processing and billing method comprising
connecting a call from a first station to a second station via an originating switch
contemporaneously with said connecting, initiating generation of a bill for said call in said originating switch,
transferring said call from said second station to a third station via a network switch,
contemporaneously with said transferring, initiating generation of a bill for said call in said network switch,
after disconnection of said second station from said call, terminating generation of said bill in said originating switch, and
after disconnection of said third station from said call, terminating generation of said bill in said network switch.

21. A call processing and billing method comprising
connecting a call from a first station to a second station,
contemporaneously with said connecting, initiating a first billing record for said call,
transferring said call from said second station to a third station, for communication between said first station and said third station,
contemporaneously with said transferring of said call from said second station to said third station, initiating a second billing record for said call, and
terminating said first billing record upon disconnecting second station from said call.

22. A method in accordance with claim 21 further comprising
transmitting said first and second billing records for use by a billing center.

23. A method in accordance with claim 21 where said transferring occurs in response to a prespecified event.

24. The invention of claim 23 wherein said prespecified event includes receipt of a disconnect signal from only one of said stations.

25. A method in accordance with claim 23 where said prespecified event includes receiving predefined signaling from one of said stations.

26. A method for completing telephone calls comprising the steps of
routing a call originated from a calling party at a customer location via a switch having a processor to a redirecting party at a primary location, said routing to said primary location being determined as a joint function of (a) the telephone number dialed by said calling party and (b) the telephone number of said customer location,
monitoring said call in said processor after it has been completed to said primary location, for a redirection signal indicative of a desire to forward said call to an alternate location, routing a second call initiated in said processor from said switch to said alternate location, said routing to said alternate location being determined at least in part as a function of said telephone number of said customer location, and completing a call path between said calling party and said alternate location which excludes said primary location, by bridging said first and second calls.

* * * * *